(12) United States Patent
Maruyama et al.

(10) Patent No.: US 11,014,289 B2
(45) Date of Patent: May 25, 2021

(54) INK SUPPLYING DEVICE AND THREE-DIMENSIONAL OBJECT FORMING DEVICE

(71) Applicant: MIMAKI ENGINEERING CO., LTD., Nagano (JP)

(72) Inventors: Kyohei Maruyama, Nagano (JP); Yoshikazu Furukawa, Nagano (JP); Kenta Imai, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 290 days.

(21) Appl. No.: 16/377,247

(22) Filed: Apr. 7, 2019

(65) Prior Publication Data
US 2019/0308367 A1 Oct. 10, 2019

(30) Foreign Application Priority Data

Apr. 9, 2018 (JP) .............................. JP2018-074926

(51) Int. Cl.

| | |
|---|---|
| *B29C 64/112* | (2017.01) |
| *B29C 64/393* | (2017.01) |
| *B29C 64/295* | (2017.01) |
| *B29C 64/264* | (2017.01) |
| *B33Y 30/00* | (2015.01) |
| *B33Y 10/00* | (2015.01) |
| *B33Y 50/02* | (2015.01) |
| *B29C 64/307* | (2017.01) |
| *B29C 64/314* | (2017.01) |

(52) U.S. Cl.
CPC .......... *B29C 64/112* (2017.08); *B29C 64/264* (2017.08); *B29C 64/295* (2017.08); *B29C 64/393* (2017.08); *B29C 64/307* (2017.08); *B29C 64/314* (2017.08); *B33Y 10/00* (2014.12); *B33Y 30/00* (2014.12); *B33Y 50/02* (2014.12)

(58) Field of Classification Search
CPC ... B29C 64/112; B29C 64/264; B29C 64/295; B29C 64/393; B29C 64/307; B29C 64/314; B33Y 10/00; B33Y 30/00; B33Y 50/02
USPC ........................................... 264/129; 425/375
See application file for complete search history.

(56) References Cited

U.S. PATENT DOCUMENTS

2014/0111585 A1* 4/2014 Nakamura ................. B41J 2/19
347/92

FOREIGN PATENT DOCUMENTS

JP 4420685 2/2010

* cited by examiner

*Primary Examiner* — Joseph S Del Sole
*Assistant Examiner* — Lawrence D. Hohenbrink, Jr.
(74) *Attorney, Agent, or Firm* — JCIPRNET (57) ABSTRACT

An ink supplying device is provided and supplies a functional ink to a droplet ejecting portion, including: a tube body through which the functional ink passes; a degasser that removes a dissolved gas from the functional ink; a first supply path in which the degasser is fitted to the tube body; a second supply path in which the degasser is not fitted to the tube body; and a controller that switches a supply path of the functional ink to the second supply path when a viscosity of the functional ink is higher than or equal to a predetermined value, and switches the supply path to the first supply path when the viscosity of the functional ink is lower than the predetermined value. The first supply path and the second supply path are coupled by an upstream side coupling portion and a downstream side coupling portion.

7 Claims, 7 Drawing Sheets

INK SUPPLYING DEVICE AND THREE-DIMENSIONAL OBJECT FORMING DEVICE

CROSS REFERENCE TO RELATED APPLICATIONS

This application claims the priority benefit of Japanese Patent Application No. 2018-074926, filed on Apr. 9, 2018. The entirety of the above-mentioned patent application is hereby incorporated by reference herein and made a part of this specification.

TECHNICAL FIELD

The present disclosure relates to an ink supplying device and a three-dimensional object forming device.

DESCRIPTION OF BACKGROUND ART

In recent years, a three-dimensional object forming device for manufacturing a three-dimensional shaped object called a so-called 3D printer has been developed. For example, the three-dimensional object forming device described in the following Japanese Patent No. 4420685 divides the three-dimensional data of a shaped object into a plurality of layers, and ejects a shaping material from an ejecting portion, and cures these layers of the shaping material in order from the lowest layer thereof, so as to form a shaped object that matches the three-dimensional data. The three-dimensional object forming device includes an inkjet type head that ejects ink serving as a shaping material. A three-dimensional object forming device described in Japanese Patent No. 4420685 uses ultraviolet curable ink as a shaping material and irradiates the ejected and landed ultraviolet curable ink with ultraviolet lights from a curing portion, so as to cure the ultraviolet curable ink. Other than the inkjet method using a curing type ink as described in the Japanese Patent No. 4420685, the forming method adopted by the three-dimensional object forming device includes: a fused deposition modeling (FDM) of melting and shaping filaments, a plaster method of curing powder plaster with adhesive, and an optical shaping method of irradiating a liquid tank of an optical shaping resin with curing light.

SUMMARY

One of the problems of the three-dimensional object forming device is a pressure loss of when supplying ink. Generally, the pressure loss increases as the viscosity of the ink used increases. Therefore, the three-dimensional object forming device operates while warming the ink which is used, so that the viscosity of the ink becomes lower than or equal to a predetermined reference. However, at the time of starting the three-dimensional object forming device, the ink is not sufficiently warmed and the viscosity of the ink is in a high state, and thus for example, ink leakage may occur from a joint or the like of a filter fitted on a path for supplying ink.

In light of the foregoing, the present disclosure provides an ink supplying device and a three-dimensional object forming device capable of preventing pressure loss of when supplying ink.

In order to solve the above-mentioned problems, the present disclosure provides an ink supplying device that supplies a functional ink to a droplet ejecting portion, and the ink supplying device includes: a tube body, through which the functional ink passes; a degasser, configured to remove a dissolved gas from the functional ink; a first supply path, in which the degasser is fitted to the tube body; a second supply path, in which the degasser is not fitted to the tube body; and a controller, configured to switch a supply path of the functional ink to the second supply path when a viscosity of the functional ink is higher than or equal to a predetermined value, and the controller is configured to switch the supply path to the first supply path when the viscosity of the functional ink is lower than the predetermined value. The first supply path and the second supply path are coupled by an upstream side coupling portion disposed on an upstream side of the degasser in a circulating direction of the functional ink, and a downstream side coupling portion disposed on a downstream side of the degasser in the circulating direction of the functional ink.

The ink supplying device further preferably includes: a heater, disposed on a downstream side of the downstream side coupling portion in the circulating direction of the functional ink. The functional ink is preferably supplied to the upstream side coupling portion through the heater.

The ink supplying device further preferably includes: a temperature detector, configured to detect a temperature inside the ink supplying device. The controller is preferably configured to determine whether or not the temperature detected by the temperature detector is lower than or equal to a predetermined threshold value. The controller switches the supply path to the first supply path, when the temperature is not lower than or not equal to the predetermined threshold value as a result of a determination. And, the controller switches the supply path to the second supply path, when the temperature is lower than or equal to the predetermined threshold value as a result of a determination.

The ink supplying device further preferably includes: a pressure detector, configured to detect a pressure of when the functional ink passes through the tube body. The controller is preferably configured to determine whether or not the pressure detected by the pressure detector is higher than or equal to a predetermined threshold value. The controller switches the supply path to the first supply path, when the pressure is not higher than or not equal to the predetermined threshold value as a result of a determination. And, the controller switches the supply path to the second supply path, when the pressure is higher than or equal to the predetermined threshold value as a result of a determination.

Furthermore, in order to solve the above-described problems, the present disclosure provides a three-dimensional object forming device that ejects a functional ink from a droplet ejecting portion toward a work surface, and cures the functional ink to form a stereoscopic shaped object on the work surface. The three-dimensional object forming device includes an ink supplying device that supplies the functional ink to the droplet ejecting portion. The ink supplying device includes: a tube body, through which the functional ink circulates; a degasser, configured to remove a dissolved gas from the functional ink; a first supply path, in which the degasser is fitted to the tube body; a second supply path, in which the degasser is not fitted to the tube body; and a controller, configured to switch a supply path of the functional ink to the second supply path when a viscosity of the functional ink is higher than or equal to a predetermined value, and the controller is configured to switch the supply path to the first supply path when the viscosity of the functional ink is lower than the predetermined value. The first supply path and the second supply path are coupled by an upstream side coupling portion disposed on an upstream side of the degasser in a circulating direction of the functional ink, and a downstream side coupling portion disposed on a downstream side of the degasser in the circulating direction of the functional ink.

The ink supplying device included in the three-dimensional object forming device further preferably includes: a temperature detector, configured to detect a temperature inside the ink supplying device. The controller of the ink supplying device is preferably configured to determine whether or not the temperature detected by the temperature detector is lower than or equal to a predetermined threshold value. The controller switches the supply path to the first supply path, when the temperature is not lower than or not equal to the predetermined threshold value as a result of a determination. And, the controller switches the supply path to the second supply path, when the temperature is lower than or equal to the predetermined threshold value as a result of a determination.

The ink supplying device included in the three-dimensional object forming device further preferably includes: a pressure detector, configured to detect a pressure of when the functional ink passes through the tube body. The controller of the ink supplying device is preferably configured to determine whether or not the pressure detected by the pressure detector is higher than or equal to a predetermined threshold value. The controller switches the supply path to the first supply path, when the pressure is not higher than or not equal to the predetermined threshold value as a result of a determination. And, the controller switches the supply path to the second supply path, when the pressure is higher than or equal to the predetermined threshold value as a result of a determination.

According to the present disclosure, the pressure loss of when supplying ink can be prevented.

DESCRIPTION OF EMBODIMENTS

Hereinafter, embodiments of an ink supplying device and a three-dimensional object forming device according to the present disclosure will be described in detail based on the drawings. The present disclosure is not limited by this embodiment. Furthermore, the configuring elements in the following embodiments include those that can be replaced by a person skilled in the art and those that are easy or substantially the same.

First Embodiment

Figure 1:
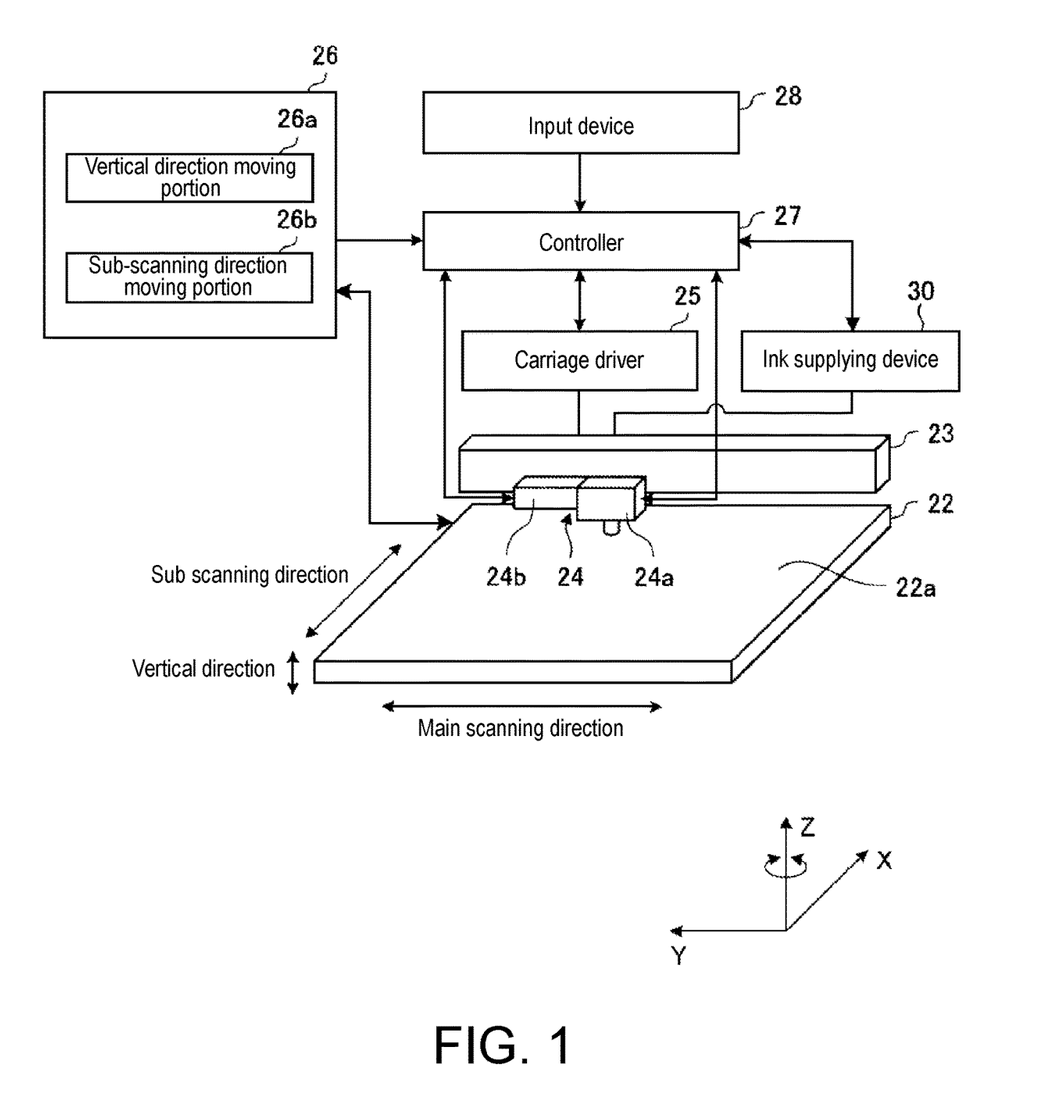
FIG. 1 is a schematic diagram showing a schematic configuration example of a three-dimensional object forming device according to an embodiment.
Figure 2:
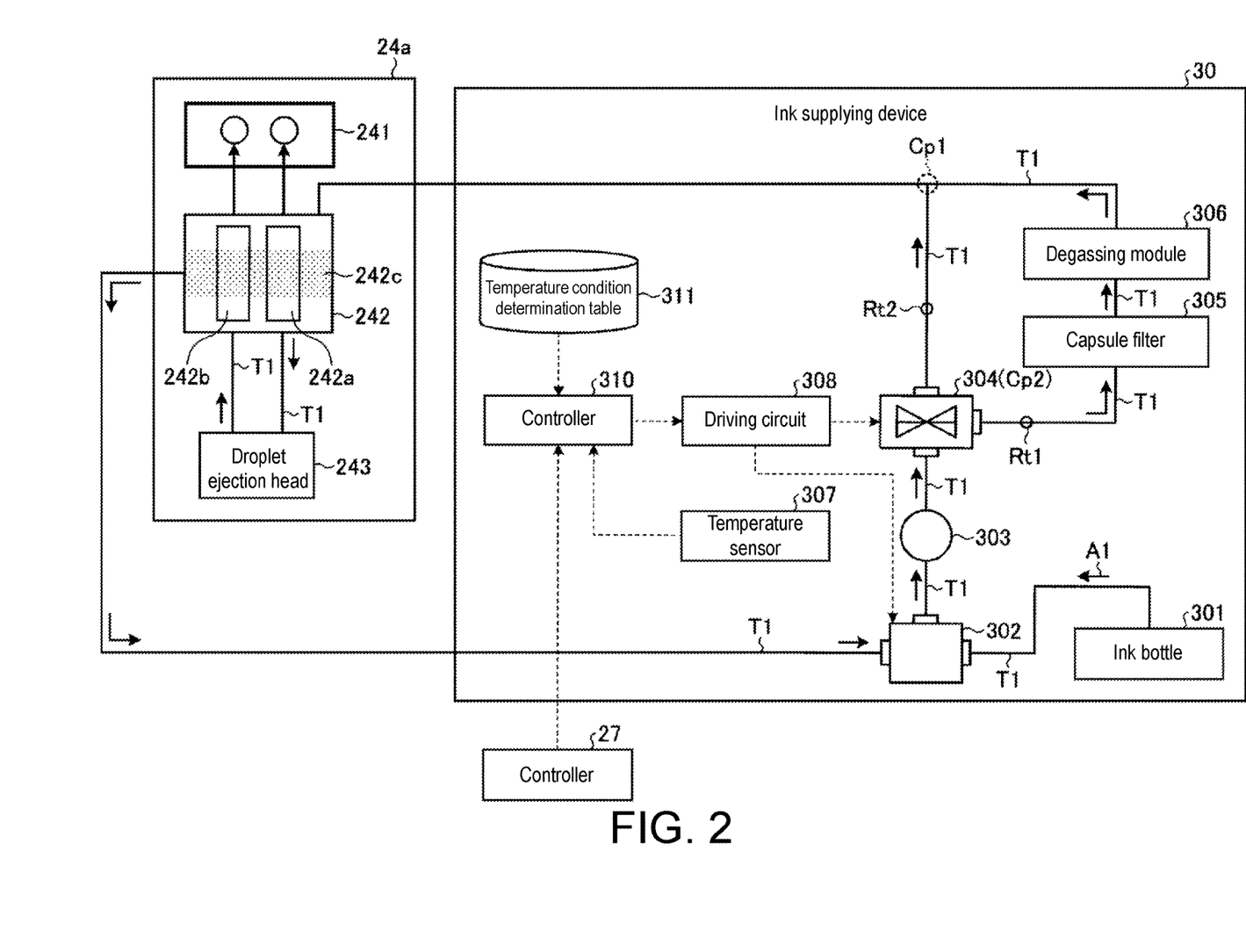
FIG. 2 is a schematic diagram showing an example of a functional configuration of an ink supplying device according to a first embodiment.

FIG. 1 is a schematic diagram showing a schematic configuration example of a three-dimensional object forming device according to an embodiment. FIG. 2 is a schematic diagram showing an example of a functional configuration of an ink supplying device 30 according to a first embodiment.

As shown in FIG. 1, the three-dimensional object forming device 10 according to the embodiment can manufacture a shaped object, which is a three-dimensional stereoscopic shaped object using a so-called inkjet method. Typically, the three-dimensional object forming device 10 divides the shaped object into a plurality of layers in the vertical direction based on the three-dimensional data of the shaped object, and creates a shaped object that matches the three-dimensional data by layering the shaping material in order from the lower layer based on the shape data for every layer of the shaped object. In the following embodiments, an example of using a Ultra Violet (UV) curable ink which is a functional ink that is cured by an ultraviolet light will be described as a shaping material.

The three-dimensional object forming device 10 includes: a mounting table 22 on which an upper surface serves as a work surface 22a, a Y bar 23, a carriage 24, a carriage driver 25, a mounting table driver 26, a controller 27, an input device 28, and an ink supplying device 30.

The work surface 22a, which is an upper surface of the mounting table 22, for example, is a plane formed flat in a direction parallel to the X axis direction and the Y axis direction shown in FIG. 1, and on which the UV curable ink serving as a shaping material is layered in order from the lower layer. The mounting table 22 is formed, for example, to a substantially rectangular shape, but is not limited thereto.

The Y bar 23 is provided at a predetermined interval on the upper side in the vertical direction of the mounting table 22. The Y bar 23 is provided linearly along a main scanning direction parallel to the Y axis direction shown in FIG. 1. The Y bar 23 guides the reciprocating movement of the carriage 24 along the main scanning direction.

The carriage 24 is held by the Y bar 23 and can reciprocate in the main scanning direction along the Y bar 23. The movement of the carriage 24 in the main scanning direction is controlled by the carriage driver 25. The carriage 24 includes a droplet ejecting portion 24a and an ultraviolet irradiator 24b physically connected to a surface facing the mounting table 22 in the vertical direction by a holder (not shown) or the like.

The droplet ejecting portion 24a can eject the UV curable ink (hereinafter referred to as ink) which is the shaping material onto the work surface 22a, while reciprocating along the main scanning direction accompanying the movement of the carriage 24 along the main scanning direction. For the ink ejected from the droplet ejecting portion 24a, for example, white ink, colored ink, transparent ink, or the like can be appropriately used according to the hue of the shaped object to manufacture.

For example, the droplet ejecting portion 24a can eject the ink supplied from the ink supplying device 30 onto the work surface 22a of the mounting table 22. As shown in FIG. 2, the droplet ejecting portion 24a includes: a negative pressure generation device 241, a sub tank 242, and a droplet ejection head 243.

The negative pressure generation device 241 stabilizes the output of the ink to be ejected from the droplet ejection head 243 by depressurizing the sub tank 242.

The sub tank 242 includes: a liquid chamber 242a, a liquid chamber 242b, and a heater 242c. The sub tank 242 stores the ink supplied from the ink supplying device 30. The sub tank 242 circulates the stored ink in the order of the liquid chamber 242a, the droplet ejection head 243, and the liquid chamber 242b, while warming the stored ink with the heater 242c. The ink stored in the sub tank 242 is sent out to the ink supplying device 30 through a tube T1 from an ink outlet (not shown) provided in the sub tank 242. The heater 242c functions as a heater that warms the ink.

The droplet ejection head 243 includes an ejection nozzle (not shown) that ejects the ink circulating between the droplet ejection head 243 and the sub tank 242 onto the work surface 22a. The ejection nozzles are provided in a number corresponding to the number of ink tanks, in other words, the number of kinds of inks that can be printed simultaneously. In a case where there are a plurality of ejection nozzles, the ejection nozzles are arranged, for example, along the main scanning direction of the Y bar 23. The ejection nozzle is, for example, an inkjet head capable of ejecting ink by the inkjet method toward the work surface 22a.

The ultraviolet irradiator 24b can irradiate the ink ejected onto the work surface 22a with the ultraviolet light, while reciprocating along the main scanning direction with the movement of the carriage 24 along the main scanning direction. The ultraviolet irradiator 24b is configured to include, for example, an LED module capable of emitting ultraviolet lights and the like.

The droplet ejecting portion 24a and the ultraviolet irradiator 24b are each electrically connected to the controller 27. The drive of each of the droplet ejecting portion 24a and the ultraviolet irradiator 24b is controlled by the controller 27.

The carriage driver 25 relatively reciprocates (scans) the carriage 24, that is, the droplet ejecting portion 24a with respect to the Y bar 23 in the main scanning direction. The carriage driver 25 is configured to include, for example, a driving source such as a transmission mechanism including a conveyor belt connected to the carriage 24, an electric motor for driving the conveyor belt, and the like. The carriage driver 25 converts the power generated by the driving source to power for moving the carriage 24 along the main scanning direction via the transmission mechanism and reciprocates the carriage 24 in the main scanning direction. The carriage driver 25 is electrically connected to the controller 27, and the drive thereof is controlled by the controller 27.

The mounting table driver 26 includes: a vertical direction moving portion 26a and a sub-scanning direction moving portion 26b. The vertical direction moving portion 26a moves the mounting table 22 along a direction parallel to the Z axis direction so that the work surface 22a formed on the mounting table 22 can be relatively moved up and down with respect to the droplet ejecting portion 24a, the ultraviolet irradiator 24b, and the like. In other words, the mounting table driver 26 can cause the work surface 22a to move closer to or away from the droplet ejecting portion 24a, the ultraviolet irradiator 24b, and the like.

The sub-scanning direction moving portion 26b moves the mounting table 22 in the sub scanning direction parallel to the X axis direction orthogonal to the main scanning direction, thereby relatively reciprocating the work surface 22a formed on the mounting table 22 with respect to the droplet ejecting portion 24a, the ultraviolet irradiator 24b, and the like. That is, the mounting table driver 26 can reciprocate the work surface 22a along the sub-scanning direction with respect to the droplet ejecting portion 24a, the ultraviolet irradiator 24b, and the like. In the embodiment, the sub-scanning direction moving portion 26b moves the mounting table 22 in the sub-scanning direction, but the embodiment of the present disclosure is not limited thereto, and the droplet ejecting portion 24a and the ultraviolet irradiator 24b may be moved in the sub-scanning direction together with the Y bar 23.

The controller 27 is configured to include hardware such as an arithmetic processing device and a storage device. The storage device can store programs for realizing arithmetic processing executed by the arithmetic processing device and data used for the arithmetic processing. The arithmetic processing device realizes various processes of the three-dimensional object forming device 10 by executing various arithmetic processing in accordance with the program stored in the storage device.

The controller 27 controls the ejection amount, ejection timing, ejection period, and the like of the ink by controlling the operation of the droplet ejecting portion 24a. The controller 27 controls the intensity, exposure timing, exposure period, and the like of the ultraviolet light to be emitted by controlling the operation of the ultraviolet irradiator 24b. The controller 27 controls the relative movement of the carriage 24 along the main scanning direction by controlling the operation of the carriage driver 25. The controller 27 controls the relative movement of the mounting table 22 along the vertical direction and the sub-scanning direction by controlling the operation of the mounting table driver 26. In controlling the operation of the droplet ejecting portion 24a, the controller 27 can transmit a signal instructing to start the supply of ink and a signal instructing to stop the supply of ink to the ink supplying device 30.

The input device 28 is connected to the controller 27. The input device 28 is provided to input three-dimensional data relating to the shape of the shaped object. The input device 28 is constituted by, for example, an electronic device such as a computer, a tablet, a smartphone, or the like connected to the controller 27 by wire or wirelessly.

As shown in FIG. 2, the ink supplying device 30 includes: an ink bottle 301, a valve portion 302, a pump 303, a path switching portion 304, a capsule filter 305, a degassing module 306, a temperature sensor 307, a driving circuit 308, a controller 310, and a temperature condition determination table 311.

An arrow A1 shown in FIG. 2 indicates the circulating (supplying) direction of ink flowing through the inside of the ink supplying device 30, the inside of the droplet ejecting portion 24a, and between the ink supplying device 30 and the droplet ejecting portion 24a by a tube T1 connecting each portion. The tube T1 functions as a tube body through which ink passes.

The ink bottle 301 stores the ink to be supplied to the droplet ejecting portion 24a. The ink bottle 301 is connected to the valve portion 302 with the tube T1.

The valve portion 302 sends the ink refluxed from the sub tank 242 (droplet ejecting portion 24a) to the pump 303, and sends the ink supplied from the ink bottle 301 to the pump 303. The valve portion 302 is connected to the sub tank 242 (droplet ejecting portion 24a), the ink bottle 301, and the pump 303 by the tube T1. The valve portion 302 opens and closes based on a control signal from the driving circuit 308.

The pump 303 sends the ink supplied from the valve portion 302 to the path switching portion 304. The pump 303 takes in and pressurizes the ink stored in the ink bottle 301 and sends out the pressurized ink to the tube T1. The pump 303 pressurizes the ink refluxed from the droplet ejecting portion 24a, and sends the pressurized ink to the tube T1.

The pump 303 is connected to the valve portion 302 and the path switching portion 304 by the tube T1.

The path switching portion 304 can execute the switching of the supply path when supplying ink to the droplet ejecting portion 24a. The path switching portion 304 switches to either one of a first supply path Rt1 in which the capsule filter 305 and the degassing module 306 are fitted in the tube T1 and a second supply path Rt2 in which the capsule filter 305 and the degassing module 306 are not fitted in the tube T1, upon receiving the supply of voltage from the driving circuit 308. The path switching portion 304 is connected to the pump 303, the capsule filter 305, and the sub tank 242 (droplet ejecting portion 24a) by the tube T1. For example, an electromagnetic valve can be used for the path switching portion 304.

The capsule filter 305 filters foreign substances contained in the ink. The capsule filter 305 is connected to the path switching portion 304 and the degassing module 306 by the tube T1. The capsule filter 305 functions as a filtering portion.

The degassing module 306 removes the gas contained in the ink. The degassing module 306 is connected to the capsule filter 305 and the sub tank 242 (droplet ejecting portion 24a) by the tube T1. The degassing module 306 functions as a degasser.

The temperature sensor 307 can detect the temperature inside the ink supplying device 30. The temperature sensor 307 can send the data of the detection result to the controller 310. The temperature sensor 307 functions as a temperature detector. The temperature detected by the temperature sensor 307 functions as indirect ink viscosity information estimated from the relationship between the ink temperature and the ink viscosity.

The driving circuit 308 supplies voltage to the path switching portion 304 based on a control signal from the controller 310, to be described later. The driving circuit 308 supplies a voltage for controlling the opening and closing operation of the valve portion 302 to the valve portion 302, so that the amount of ink inside the tube T1 becomes constant based on the information on the amount of ink of the sub tank 242. The driving circuit 308 controls the opening and closing state of the valve portion 302, so that the ink sucked up from the ink bottle 301 is supplied to the inside of the tube T1 at the time of ink supply. The driving circuit 308 controls the opening and closing state of the valve portion 302, so that the ink flowing inside the tube T1 is circulated as it is at the time of ink circulation.

The controller 310 can control the switching of the supply path by the path switching portion 304 based on the temperature condition stored in the temperature condition determination table 311 to be described later. When executing the supply of ink, for example, the controller 310 determines whether or not the temperature detected by the temperature sensor 307 is higher than or equal to a predetermined threshold value. For example, 10 [° C.] can be adopted as the threshold value used for determination by the controller 310 if it is UV curable ink.

When the temperature detected by the temperature sensor 307 exceeds a predetermined threshold value (e.g., exceeds 10° C.) as a result of a determination, the controller 310 sends a control signal to the driving circuit 308 so that the supply path of the ink is switched to the first supply path Rt1 by the path switching portion 304. On the other hand, when the temperature detected by the temperature sensor 307 is lower than or equal to a predetermined threshold value (e.g., lower than or equal to 10° C.) as a result of a determination, the controller 310 sends a control signal to the driving circuit 308 so that the supply path of the ink is switched to the second supply path Rt2 by the path switching portion 304.

As illustrated in FIG. 2, the first supply path Rt1 and the second supply path Rt2, which are ink supply paths, are coupled by an upstream side coupling portion CP1 disposed on the upstream side of the degassing module 306 with respect to the ink supplying (circulating) direction and the path switching portion 304 functioning as a downstream side coupling portion CP2 disposed on the downstream side of the degassing module 306 with respect to the ink supplying (circulating) direction. For example, when the temperature detected by the temperature sensor 307 is 10° C. or lower, the ink warmed by the heater 242c of the sub tank 242 is passed through the second supply path Rt2 in which the degassing module is not interposed, and circulated through the upstream side coupling portion CP1. On the other hand, for example, when the temperature detected by the temperature sensor 307 exceeds 10° C., the ink warmed by the heater 242c of the sub tank 242 is passed through the first supply path Rt1 in which the degassing module is interposed, and circulated through the upstream side coupling portion CP1.

The temperature condition determination table 311 can store the temperature condition used for the switching determination of the ink supply path. In the temperature condition determination table 311, a threshold value (temperature) for executing the switching of the supply path of ink can be stored as a temperature condition. The temperature condition determination table 311 may store a preset temperature condition according to the type of ink supplied from the ink supplying device 30 to the droplet ejecting portion 24a. The temperature condition determination table 311 can store, for example, 10 [° C.] as the threshold value if it is UV curable ink. The temperature condition stored in the temperature condition determination table 311 is set based on the known relationship between the ink temperature and the ink viscosity. As an example of the relationship between the ink temperature and the ink viscosity, for example, if the temperature is 10° C., a UV curable ink whose viscosity corresponding to such temperature is 100 [mPa·S] is known.

Figure 3:
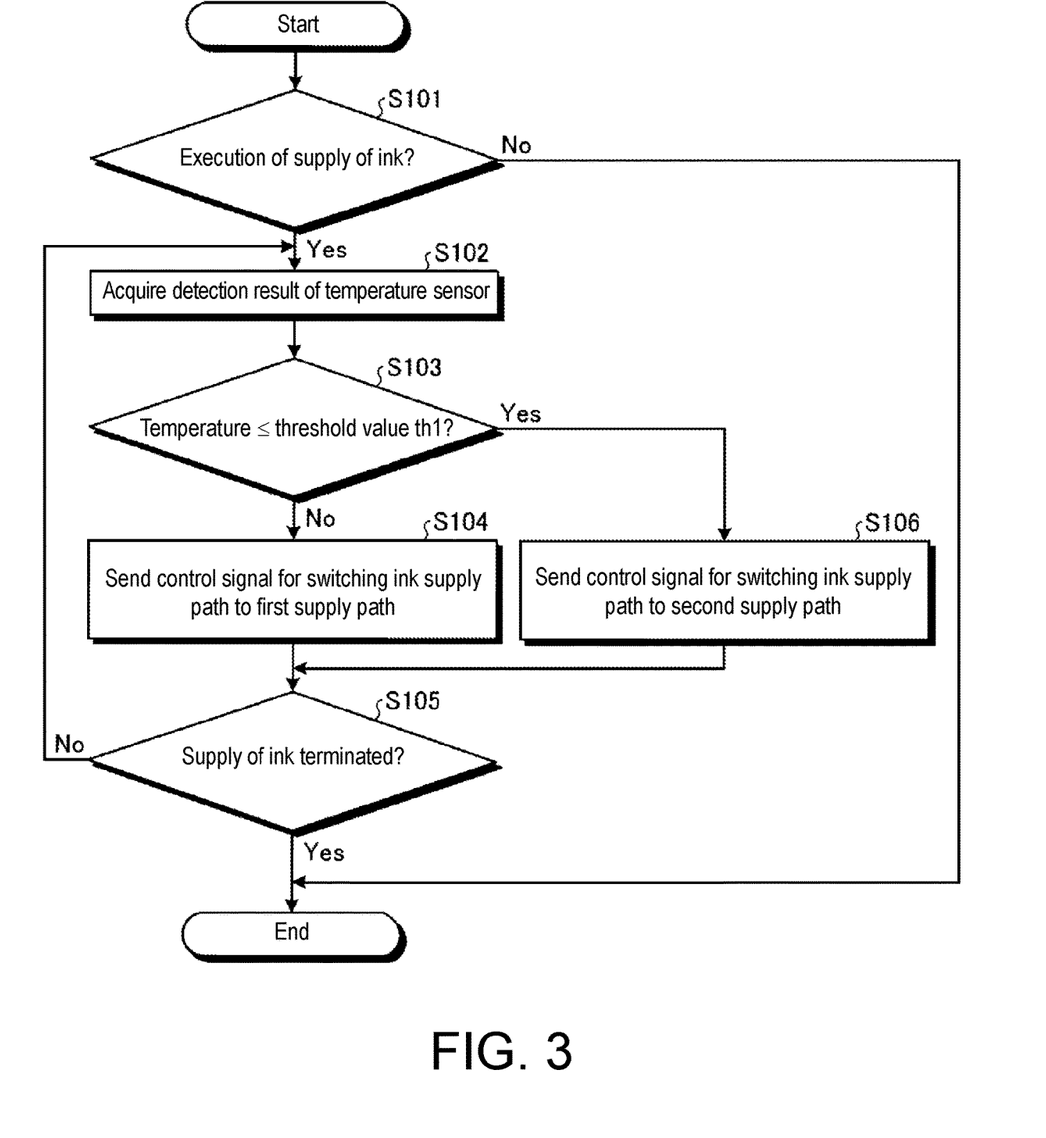
FIG. 3 is a flowchart showing an example of processing by the ink supplying device in the first embodiment.

FIG. 3 is a flowchart showing an example of processing by the ink supplying device 30 in the first embodiment. The processing shown in FIG. 3 is executed by the controller 310.

As shown in FIG. 3, the ink supplying device 30 determines whether or not to execute supply of ink (step S101). For example, the ink supplying device 30 determines whether or not a signal instructing to start of the supply of ink is received from the controller 27.

When executing the supply of ink (step S101, Yes) as a result of the determination, the ink supplying device 30 acquires the detection result of the temperature sensor 307 (step S102).

Subsequently, the ink supplying device 30 determines whether or not the temperature inside the ink supplying device 30 acquired as the detection result of the temperature sensor is lower than or equal to a threshold value "th1" (step S103).

When the temperature inside the ink supplying device 30 is not lower than or not equal to the threshold value th1 (step S103, No) as a result of the determination, the ink supplying device 30 sends a control signal for switching the ink supply path to the first supply path Rt1 to the driving circuit 308 (step S104).

Then, the ink supplying device 30 determines whether or not to terminate the supply of ink (step S105). For example, the ink supplying device 30 determines whether or not a signal instructing to stop the supply of ink is received from the controller 27.

When terminating the supply of ink (step S105, Yes) as a result of the determination, the ink supplying device 30 terminates the processing shown in FIG. 3.

On the other hand, when not terminating the supply of ink (step S105, No) as a result of a determination, the ink supplying device 30 returns to the procedure of step S102.

In step S103, when the temperature inside the ink supplying device 30 is lower than or equal to the threshold value th1 as a result of the determination in step S103 (step S103, Yes), the ink supplying device 30 sends a control signal for switching the ink supply path to the second supply path Rt2 to the driving circuit 308 (step S106), and proceeds to the determination in step S105.

When not executing the supply of ink as a result of the determination in step S101 (step S101, No), the ink supplying device 30 terminates the processing shown in FIG. 3.

As described above, the ink supplying device 30 according to the first embodiment can supply ink to the droplet ejecting portion 24a using the second supply path Rt2 in which the capsule filter 305 and the degassing module 306 are not fitted to the tube T1 when the temperature inside the ink supplying device 30 is lower than or equal to a predetermined threshold value, that is, when the ink viscosity is assumed to be high. Therefore, according to the first embodiment, the ink can be supplied without passing through the capsule filter 305, in which the pressure loss is large, at all, whereby the pressure loss in supplying the ink can be prevented to the utmost. Further, since the ink can be supplied using the first supply path Rt1 when the viscosity of the ink is low, occurrence of ink leakage from a joint or the like of a filter fitted to the path for supplying ink can also be prevented.

In the ink supplying device 30 according to the first embodiment, when the temperature detected by the temperature sensor 307 is 10° C. or lower, the ink warmed by the heater 242c of the sub tank 242 is passed through the second supply path Rt2 in which the degassing module is not interposed, and circulated through the upstream side coupling portion CP1. On the other hand, for example, when the temperature detected by the temperature sensor 307 exceeds 10° C., the ink warmed by the heater 242c of the sub tank 242 is passed through the first supply path Rt1 in which the degassing module is interposed, and circulated through the upstream side coupling portion CP1. Thus, the ink supplying device 30 according to the first embodiment forms a series of circuits that can return the ink whose viscosity has decreased by being heated by the heater 242c, whereby the ink in which the viscosity of the ink is decreased to lower than or equal to a predetermined viscosity can be supplied to the supply path in which the degassing module 306 is disposed.

Second Embodiment

Figure 4:
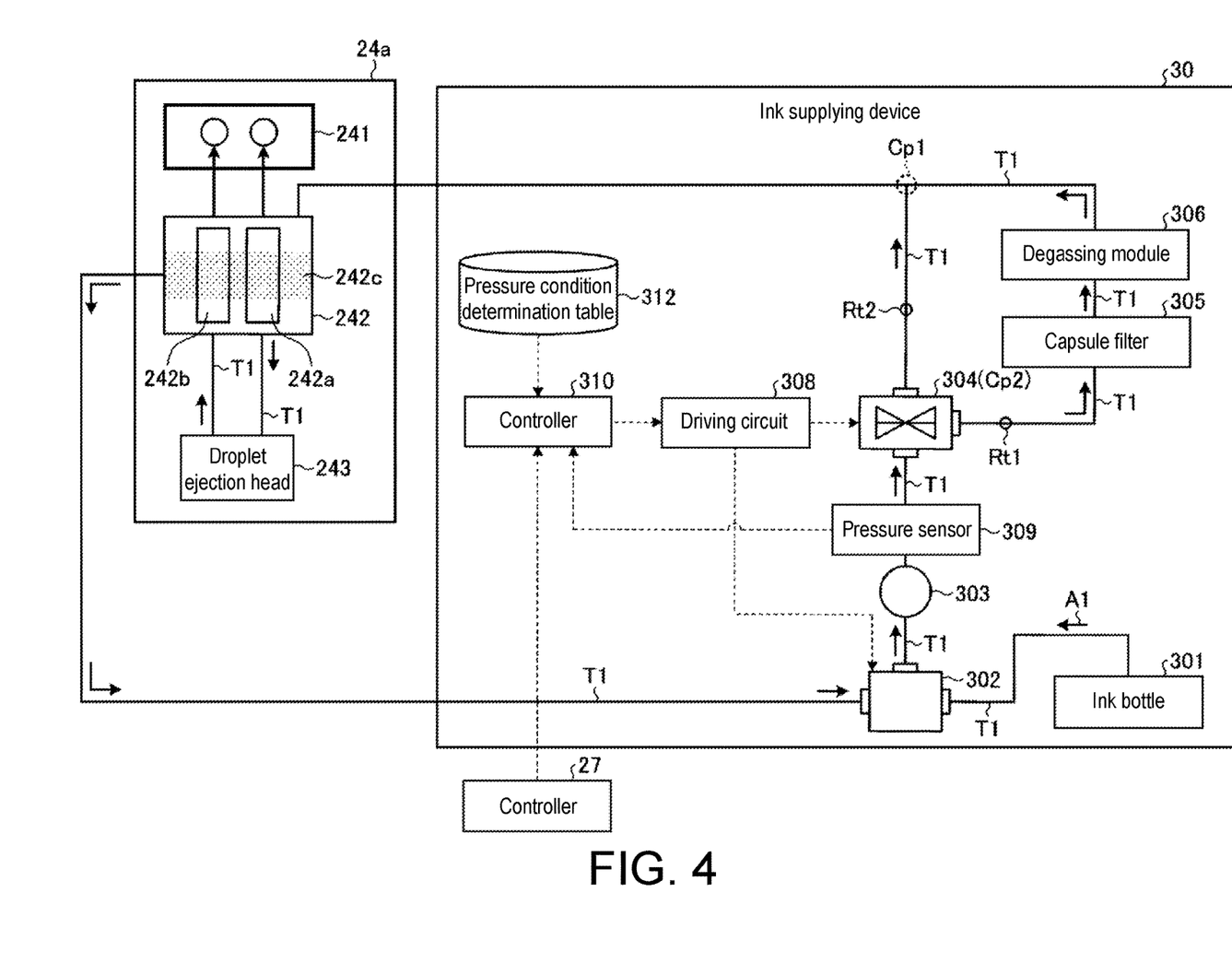
FIG. 4 is a schematic diagram showing an example of a functional configuration of an ink supplying device according to a second embodiment.

FIG. 4 is a schematic diagram showing an example of a functional configuration of an ink supplying device 30 according to a second embodiment. The ink supplying device 30 according to the second embodiment is different from the first embodiment in that a pressure sensor 309 is provided in place of the temperature sensor 307, and a pressure condition determination table 312 is provided in place of the temperature condition determination table 311.

The pressure sensor 309 can detect the pressure of when the ink passes through the inside of a tube T1. The pressure sensor 309 can send the data of the detection result to a controller 310. The pressure detected by the pressure sensor 309 functions as indirect ink viscosity information estimated from the relationship between the pressure of when the ink passes through the inside of the tube T1 and the viscosity of the ink.

The pressure condition determination table 312 can store a pressure condition used for the switching determination of the ink supply path. The pressure condition determination table 312 can store a threshold value (pressure) for executing the switching of the ink supply path as a pressure condition. The pressure condition determination table 312 may store a plurality of preset pressure conditions according to the type of ink supplied from the ink supplying device 30 to a droplet ejecting portion 24a. The pressure condition determination table 312 can store, for example, 100 [kPa] as the threshold value if it is UV curable ink. The pressure condition stored in the pressure condition determination table 312 is set based on the known relationship between the ink pressure and ink viscosity. As an example of the relationship between the ink pressure and the ink viscosity, for example, if the pressure is 100 [kPa], a UV curable ink whose viscosity corresponding to such pressure is 10 [mPa·S] is known.

The controller 310 can control the switching of the supply path by the path switching portion 304 based on the pressure condition stored in the pressure condition determination table 312. When executing the supply of ink, for example, the controller 310 determines whether or not the pressure detected by the pressure sensor 309 is lower than or equal to a predetermined threshold value. For example, 100 [kPa] can be adopted as the threshold value used for determination by the controller 310 if it is UV curable ink.

When the pressure detected by the pressure sensor 309 is not higher than or not equal to a predetermined threshold value (e.g., when lower than 100 [kPa]) as a result of the determination, the controller 310 sends a control signal to the driving circuit 308 so that the supply path of the ink is switched to the first supply path Rt1 by the path switching portion 304. On the other hand, when the pressure detected by the pressure sensor 309 is higher than or equal to a predetermined threshold value (e.g., when higher than or equal to 100 [kPa]) as a result of a determination, the controller 310 sends a control signal to the driving circuit 308 so that the supply path of the ink is switched to the second supply path Rt2 by the path switching portion 304.

Figure 5:
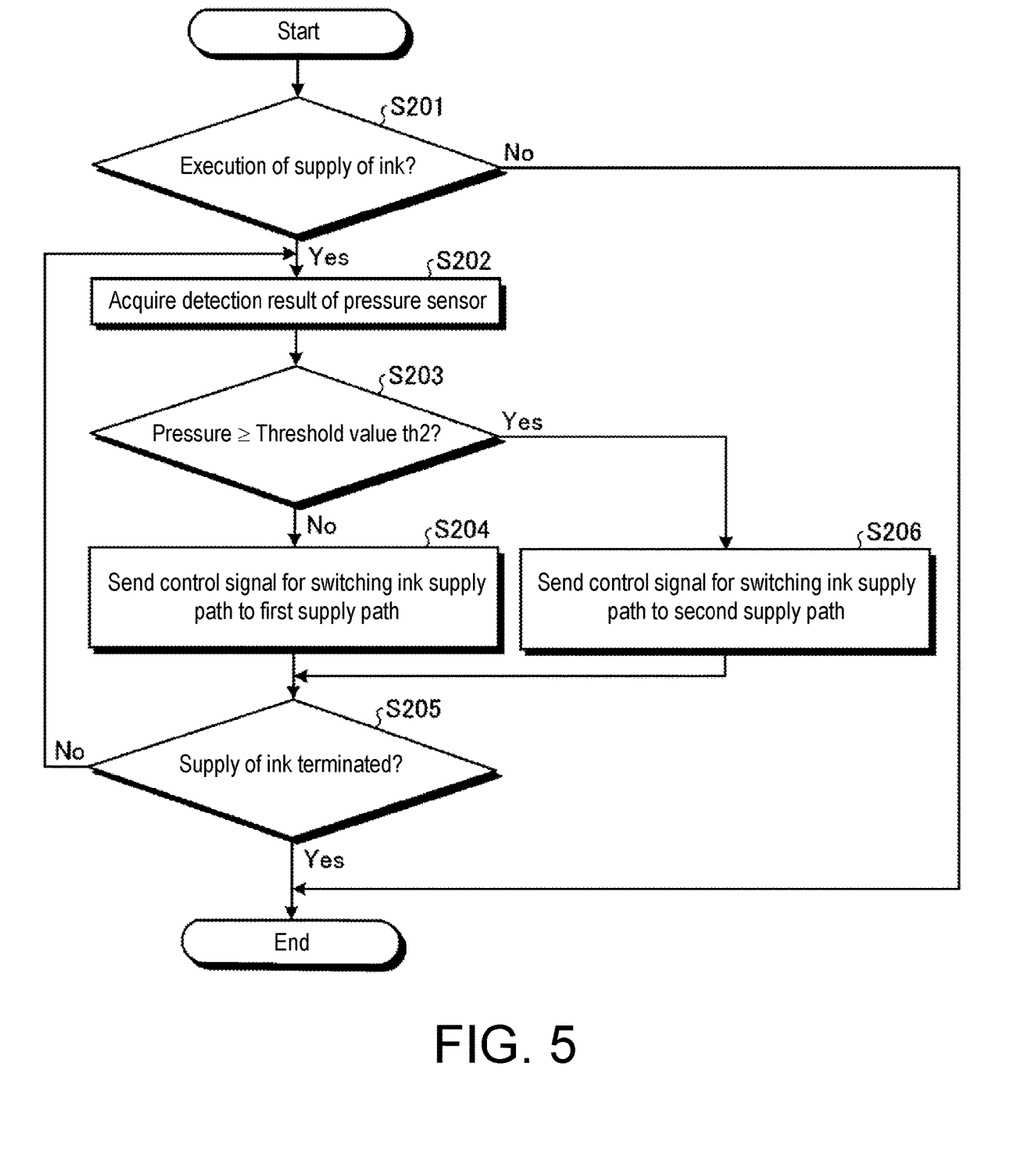
FIG. 5 is a flowchart showing an example of processing by the ink supplying device in the second embodiment.

FIG. 5 is a flowchart showing an example of processing by the ink supplying device 30 in the second embodiment. The processing shown in FIG. 5 is executed by the controller 310.

As shown in FIG. 5, the ink supplying device 30 determines whether or not to execute supply of ink (step S201). For example, the ink supplying device 30 determines whether or not a signal instructing to start of the supply of ink is received from the controller 27.

When executing the supply of ink (step S201, Yes) as a result of the determination, the ink supplying device 30 acquires the detection result of the pressure sensor (step S202).

Subsequently, the ink supplying device 30 determines whether or not the pressure acquired as the detection result of the pressure sensor is higher than or equal to a threshold value "th2" (step S203).

When the pressure is not higher than or not equal to the threshold value th2 as a result of the determination (step S203, No), the ink supplying device 30 sends a control signal for switching the ink supply path to the first supply path Rt1 to the driving circuit 308 (step S204).

Then, the ink supplying device 30 determines whether or not to terminate the supply of ink (step S205). For example, the ink supplying device 30 determines whether or not a signal instructing to stop the supply of ink is received from the controller 27.

When terminating the supply of ink as a result of the determination (step S205, Yes), the ink supplying device 30 terminates the processing shown in FIG. 5.

On the other hand, when not terminating the supply of ink as a result of the determination (step S205, No), the ink supplying device 30 returns to the procedure of step S202.

When the temperature inside the ink supplying device 30 is higher than or equal to the threshold value th2 as a result of the determination in step S203 (step S203, Yes), the ink supplying device 30 sends a control signal for switching the ink supply path to the second supply path Rt2 to the driving circuit 308 (step S206), and proceeds to the determination in step S205.

When not executing the supply of ink as a result of the determination in step S201 (step S201, No), the ink supplying device 30 terminates the processing shown in FIG. 5.

As described above, the ink supplying device 30 according to the second embodiment can supply ink to the droplet ejecting portion 24a using the second supply path Rt2 in which a capsule filter 305 and a degassing module 306 are not fitted to the tube T1 when the pressure of when the ink passes through the tube T1 is not lower than or equal to the predetermined threshold value, that is, when the ink viscosity is assumed to be high. Therefore, according to the second embodiment, the ink can be supplied without passing through the capsule filter 305, in which the pressure loss is large, at all, whereby the pressure loss in supplying the ink can be prevented to the utmost. Further, since the ink can be supplied using the first supply path Rt1 when the viscosity of the ink is low, occurrence of ink leakage from a joint or the like of a filter fitted to the path for supplying ink can also be prevented.

Other Embodiments (1) Hardware Configuration

Figure 6:
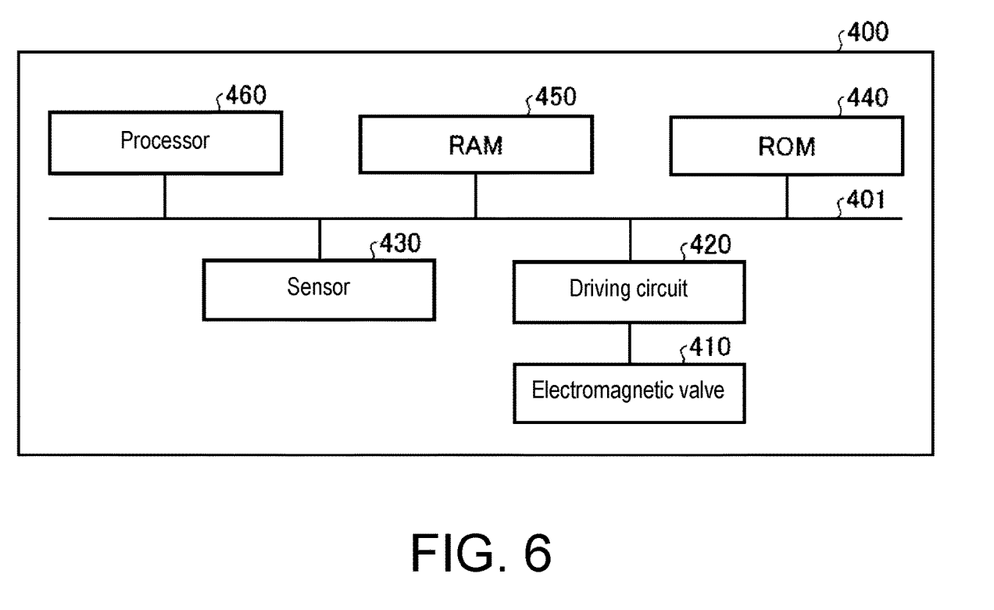
FIG. 6 is a diagram showing an example of a computer that executes a program having a function similar to that of the ink supplying device according to the embodiment.

Various processes (see e.g., FIG. 3, FIG. 5, etc.) executed by the ink supplying device 30 described in the first and second embodiments is realized by executing a program prepared in advance on a computer system. Therefore, in the following, an example of a computer that executes a program having the function similar to that of the ink supplying device 30 described in the first and second embodiments will be described. FIG. 6 is a diagram showing an example of a computer that executes a program having a function similar to that of the ink supplying device according to the embodiment.

As shown in FIG. 6, a computer 400 functioning as the ink supplying device 30 is configured by connecting a driving circuit 420, a sensor 430, a Read Only Memory (ROM) 440, a Random Access Memory (RAM) 450, and a processor 460 via a bus 401.

The driving circuit 420 is connected to an electromagnetic valve 410 and drives the electromagnetic valve 410. The driving circuit 420 corresponds to, for example, the driving circuit 308. The electromagnetic valve 410 corresponds to, for example, the path switching portion 304.

The sensor 430 collects information on the inside of the computer 400 or the surrounding of the computer 400. The information acquired by the sensor 430 includes data on the temperature inside the computer and data on the pressure of when the ink passes through the tube T1. The sensor 430 corresponds to, for example, the temperature sensor 307 or the pressure sensor 309.

The ROM 440 stores programs and data necessary for executing various processes by the processor 460. The program stored in the ROM 440 includes a program that provides a function for realizing processing executed by the ink supplying device 30 described in the first and second embodiments. The data stored in the ROM 440 includes data set in advance in the temperature condition determination table 311 and the pressure condition determination table 312. The RAM 450 temporarily stores various kinds of information. The processor 460 executes various arithmetic processing. The ROM 440, the RAM 450, and the processor 460 correspond to, for example, the controller 310.

As the processor 460 reads a program that provides a function for realizing the processing executed by the ink supplying device 30 from the ROM 440 and develops the program in the RAM 450, the program developed in the RAM 450 functions as a process corresponding to the process executed by the ink supplying device 30. For example, the process reads data collected by the sensor 430, data set in advance in the temperature condition determination table 311, data set in advance in the pressure condition determination table 312, and the like from the ROM 440 and develops it in a region assigned to itself in the RAM 450, and executes various processes based on the developed data and the like.

The program stored in the ROM 440 does not necessarily need to be stored in the ROM 440 from the beginning, and for example, each program may be stored in a collective or dispersed manner in a "portable physical medium" such as a CD-ROM, a DVD disk, a magneto-optic disk, an Integrated Circuit (IC) card, or the like inserted to the computer 400, and furthermore, "another computer (or server)" connected to the computer 400 via a public line, the Internet, a Local Area Network (LAN), Wide Area Network (WAN), or the like, etc., and the computer 400 may read out and execute each program.

The embodiment of the present disclosure, as shown in FIG. 6, is not limited to an example of realizing the processing executed by the ink supplying device 30 described in the first and second embodiments by the processor 460 reading out and executing the program stored in the ROM 440. The processing executed by the ink supplying device 30 described in the first and second embodiments may be realized by a wired logic in which a plurality of processing circuits for realizing each of the processes executed by the ink supplying device 30 described in the first and second embodiments are linked. For example, a circuit such as Application Specific Integrated Circuit (ASIC) or Field Programmable Gate Array (FPGA) can be applied to the processing circuit for realizing the process corresponding to the processing executed by the ink supplying device 30 described in the first and second embodiments.

(2) Another Configuration Example

Figure 7:
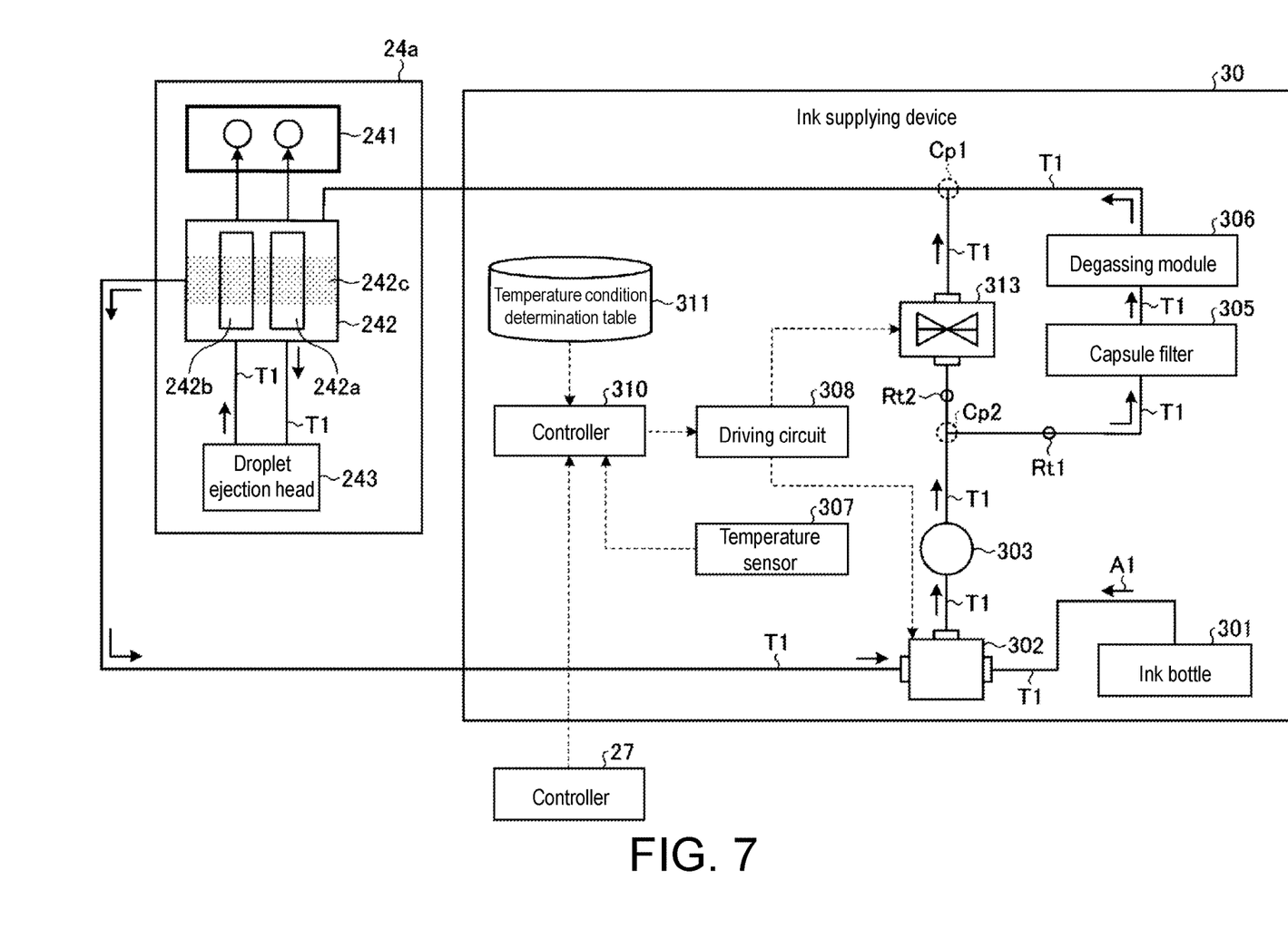
FIG. 7 is a diagram showing another configuration example of the ink supplying device according to the embodiment.

Hereinafter, another configuration example of the ink supplying device 30 will be described with reference to FIG. 7. FIG. 7 is a diagram showing another configuration example of the ink supplying device according to the embodiment.

As shown in FIG. 7, in the ink supplying device 30 may include a valve portion 313 on the second supply path Rt2. The controller 310 controls the ink supply path based on the temperature condition stored in the temperature condition determination table 311. Specifically, when the temperature detected by the temperature sensor 307 is not higher than or equal to the predetermined threshold value (when the temperature is less than the threshold value), the controller 310 sends the control signal to the driving circuit 308 so that the ink supply path is switched to the second supply path Rt2. The driving circuit 308 supplies voltage to the valve portion 313 based on a control signal from the controller 310. The valve portion 313 opens the outlet (valve) of the ink to the droplet ejecting portion 24a upon receiving the supply of voltage from the driving circuit 308.

Thus, when the temperature inside the ink supplying device 30 is lower than or equal to a predetermined threshold value, that is, when the ink viscosity is assumed to be high, the ink supplying device 30 shown in FIG. 7 can supply ink using not the first supply path Rt1 in which the pressure loss of when supplying ink occurs as the ink is passed through the capsule filter 305 and the like, but the second supply path Rt2 in which the pressure loss is considered to be small compared to the first supply path Rt1 as the capsule filter 305 and the like are not provided. Therefore, according to the ink supplying device 30 shown in FIG. 7, the pressure loss of when supplying ink can be prevented as much as possible. Similarly to the first embodiment and the second embodiment, when the temperature detected by the temperature sensor 307 is 10° C. or lower, the ink warmed by the heater 242c of the sub tank 242 passes through the downstream side coupling portion CP2, through the second supply path Rt2 where the degassing module 306 is not interposed, and circulated through the upstream side coupling portion CP1. On the other hand, for example, when the temperature detected by the temperature sensor 307 exceeds 10° C., the ink warmed by the heater 242c of the sub tank 242 passes through the downstream side coupling portion CP2, through the first supply path Rt1 where the degassing module 306 is interposed, and circulated through the upstream side coupling portion CP1. Thus, the ink supplying device 30 according to the first embodiment forms a series of circuits that can return the ink whose viscosity has decreased by being heated by the heater 242c, whereby the ink in which the viscosity of the ink is decreased to lower than or equal to a predetermined viscosity can be supplied to the supply path in which the degassing module 306 is disposed.

Furthermore, in the case where the capsule filter 305 has an internal structure capable of flowing ink in a state of less pressure loss than when passing through at least a filter such as an air release port for releasing air in the capsule filter, the capsule filter 305 (air release port, etc.) and the valve portion 313 can be directly connected by a tube or the like. At this time, the second supply path Rt2 can also be used as a path for releasing air in the capsule filter.

As with the second embodiment described above, the configuration shown in FIG. 7 can be similarly applied even to the case of the ink supplying device 30 that executes processing using the pressure of when the ink passes through the inside of the tube T1. That is, in a case where the pressure of when the ink passes through the inside of the tube T1 is not lower than or equal to a predetermined threshold value, that is, when the viscosity of the ink is assumed to be high, the controller 310 sends a control signal to the driving circuit 308 so that the ink supply path is switched to the second supply path Rt2.

The embodiment of the present disclosure is not limited to the example in which an electromagnetic valve is adopted for the path switching portion 304, and the processing of the ink supplying device 30 described in the first and second embodiments above may be realized by adopting a release valve for the path switching portion 304.

In the first and second embodiments described above, an example in which UV curable ink that cures by ultraviolet light is used as the ink supplied by the ink supplying device 30 has been described, but the embodiment of the present disclosure is not limited to this example. For example, even for ink other than the UV curable ink, the processing of the first and second embodiments described above may also be applied to the ink that supplies other ink having a possibility of causing pressure loss. In this case, a temperature condition, a pressure condition, or the like is set in advance according to the viscosity of the ink, and the ink supplying device 20 can execute the processing based on the temperature condition or the pressure condition set in advance.

In the first and second embodiments described above, an example in which the controller 310 of the ink supplying device 30 executes the processing of the ink supplying device 30 has been described, but the present disclosure is not limited to this example, and for example, the controller 27 of the three-dimensional object forming device 10 may execute the processing of the ink supplying device 30. In this case, the controller 27 obtains the data of the temperature sensor 307 or the pressure sensor 309, executes the determination of the temperature condition or the pressure condition, and transmits the control signal for controlling the switching of the ink supply path to the driving circuit 308 to realize the processing of the ink supplying device 30.

What is claimed is:

1. An ink supplying device that supplies a functional ink to a droplet ejecting portion, and the ink supplying device comprising:
    a tube body, through which the functional ink passes;
    a degasser, configured to remove a dissolved gas from the functional ink;
    a first supply path, in which the degasser is fitted to the tube body;
    a second supply path, in which the degasser is not fitted to the tube body; and
    a controller, configured to switch a supply path of the functional ink to the second supply path when a viscosity of the functional ink is higher than or equal to a predetermined value, and the controller is configured to switch the supply path to the first supply path when the viscosity of the functional ink is lower than the predetermined value;
    wherein
    the first supply path and the second supply path are coupled by an upstream side coupling portion disposed on an upstream side of the degasser in a circulating direction of the functional ink, and a downstream side coupling portion disposed on a downstream side of the degasser in the circulating direction of the functional ink.

2. The ink supplying device according to claim 1, further comprising:
    a heater, disposed on a downstream side of the downstream side coupling portion in the circulating direction of the functional ink;
    wherein
    the functional ink is refluxed to the upstream side coupling portion through the heater.

3. The ink supplying device according to claim 1, further comprising:
    a temperature detector, configured to detect a temperature inside the ink supplying device;
    wherein the controller is configured to determine whether or not the temperature detected by the temperature detector is lower than or equal to a predetermined threshold value, the controller switches the supply path to the first supply path, when the temperature is not lower than or not equal to the predetermined threshold value as a result of a determination, and the controller switches the supply path to the second supply path, when the temperature is lower than or equal to the predetermined threshold value as a result of a determination.

4. The ink supplying device according to claim 1, further comprising:

a pressure detector, configured to detect a pressure of when the functional ink passes through the tube body;

wherein the controller is configured to determine whether or not the pressure detected by the pressure detector is higher than or equal to a predetermined threshold value, the controller switches the supply path to the first supply path, when the pressure is not higher than or not equal to the predetermined threshold value as a result of a determination, and the controller switches the supply path to the second supply path, when the pressure is higher than or equal to the predetermined threshold value as a result of a determination.

5. A three-dimensional object forming device that ejects a functional ink from a droplet ejecting portion toward a work surface, and cures the functional ink to form a stereoscopic shaped object on the work surface, and the three-dimensional object forming device comprising:

an ink supplying device that supplies the functional ink to the droplet ejecting portion, and the ink supplying device comprising:

a tube body, through which the functional ink circulates;

a degasser, configured to remove a dissolved gas from the functional ink;

a first supply path, in which the degasser is fitted to the tube body;

a second supply path, in which the degasser is not fitted to the tube body; and a controller, configured to switch a supply path of the functional ink to the second supply path when a viscosity of the functional ink is higher than or equal to a predetermined value, and the controller is configured to switch the supply path to the first supply path when the viscosity of the functional ink is lower than the predetermined value;

wherein the first supply path and the second supply path are coupled by an upstream side coupling portion disposed on an upstream side of the degasser in a circulating direction of the functional ink, and a downstream side coupling portion disposed on a downstream side of the degasser in the circulating direction of the functional ink.

6. The three-dimensional object forming device according to claim 5, wherein the ink supplying device further comprises:

a temperature detector, configured to detect a temperature inside the ink supplying device; and the controller is configured to determine whether or not the temperature detected by the temperature detector is lower than or equal to a predetermined threshold value, the controller switches the supply path to the first supply path, when the temperature is not lower than or not equal to the predetermined threshold value as a result of a determination, and the controller switches the supply path to the second supply path, when the temperature is lower than or equal to the predetermined threshold value as a result of a determination.

7. The three-dimensional object forming device according to claim 5, wherein the ink supplying device further comprises:

a pressure detector, configured to detect a pressure of when the functional ink passes through the tube body;

wherein the controller is configured to determine whether or not the pressure detected by the pressure detector is higher than or equal to a predetermined threshold value, the controller switches the supply path to the first supply path, when the pressure is not higher than or not equal to the predetermined threshold value as a result of a determination, and the controller switches the supply path to the second supply path, when the pressure is higher than or equal to the predetermined threshold value as a result of a determination.

* * * * *